Figure 1:
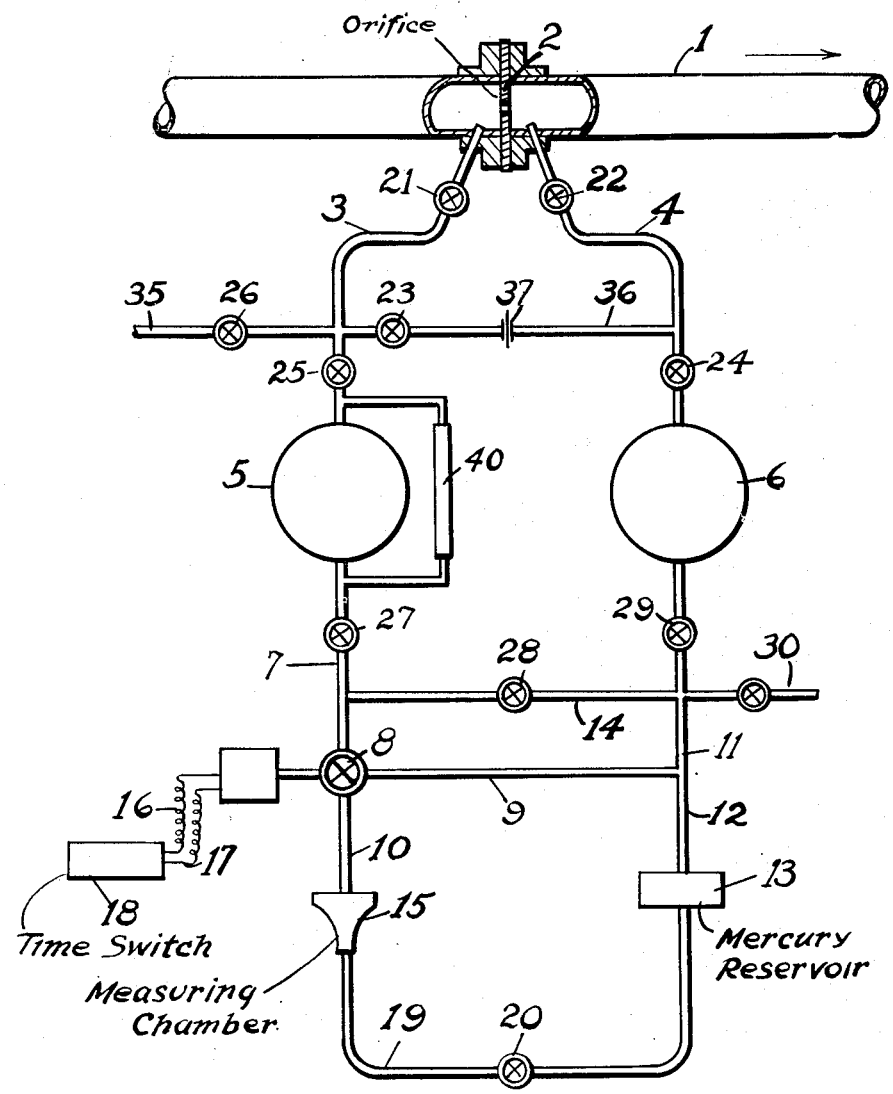

Sept. 2, 1952　　　H. B. BREEDLOVE ET AL　　　2,608,866
FLUID SAMPLING EQUIPMENT

Filed June 24, 1948　　　　　　　　　　　　　　2 SHEETS—SHEET 1

Harry B. Breedlove  Inventors
Henry G. Abbott
By W. O. Heilman  Attorney

Sept. 2, 1952  H. B. BREEDLOVE ET AL  2,608,866
FLUID SAMPLING EQUIPMENT

Filed June 24, 1948  2 SHEETS—SHEET 2

Harry B. Breedlove Inventors
Henry G. Abbott
By W. V. Heilman Attorney

Patented Sept. 2, 1952

2,608,866

UNITED STATES PATENT OFFICE 2,608,866

FLUID SAMPLING EQUIPMENT

Harry B. Breedlove and Henry G. Abbott, Baton Rouge, La., assignors to Standard Oil Development Company, a corporation of Delaware Application June 24, 1948, Serial No. 35,014

5 Claims. (Cl. 73—422)

This invention relates to apparatus employed for withdrawing samples of fluid from a particular conduit. In particular, the invention concerns an apparatus for automatically withdrawing a quantity of sample from a fluid line which is proportional to the flow rate of the fluid in the line. The apparatus is adaptable to automatic control permitting consecutive samples to be withdrawn periodically at any desired intervals of time, so as to provide a composite sample representative of the total fluid flow during the sampling intervals. The apparatus may be employed in conjunction with lines operated at any temperature or pressure and carrying any type of fluid such as oil, gas, water, etc.

In the control of chemical processes, it is extremely important to establish suitable sampling techniques for the determination of the quality and nature of materials utilized in the processes. Ordinarily no particular problems are involved in the sampling of fluids employed in batch processes. However in the case of continuous processes it is often desirable or necessary to obtain samples of fluids being conducted through lines at rapid and variable flow rates. Clearly no simple sampling technique is suitable for obtaining a true sample under such conditions. Thus if fixed quantities of sample are periodically withdrawn from a fluid line at fixed time intervals during which the composition and flow rate is changing, the samples will not properly represent the composition of the fluid flowing through the line. A solution to this problem is to withdraw quantities of samples which are proportional to the flow rate at the instant the sample is taken. A composite of such samples will properly represent the composition of the fluid sampled over the entire sampling period. While many improvements have been made in the technique and apparatus used for sampling, at the present time, sampling devices have not been satisfactorily developed to automatically withdraw a quantity of sample proportional to the flow of a fluid being sampled. Generally an approximation of this is obtained merely by withdrawing particular sized samples at frequent intervals. It is therefore the principal object of this invention to provide apparatus which will automatically accomplish this objective.

A further difficulty in sampling is encountered when it is necessary to withdraw samples from lines under either very high or very low pressures. In either case complicated equipment is required to obtain the samples, in spite of which the composition of the samples may be altered due to the withdrawal procedure employed. It is therefore a further object of this invention to provide apparatus permitting the withdrawal of a sample from a fluid conduit under any pressure, at the pressure existing in the conduit assuring a substantial identity between the nature of the sample and the material in the line from which the sample is drawn.

The nature of this invention will be better understood from the following detailed description in connection with the accompanying drawings which show diagrammatically in elevation preferred embodiments of the apparatus of this invention.

Figure 2:
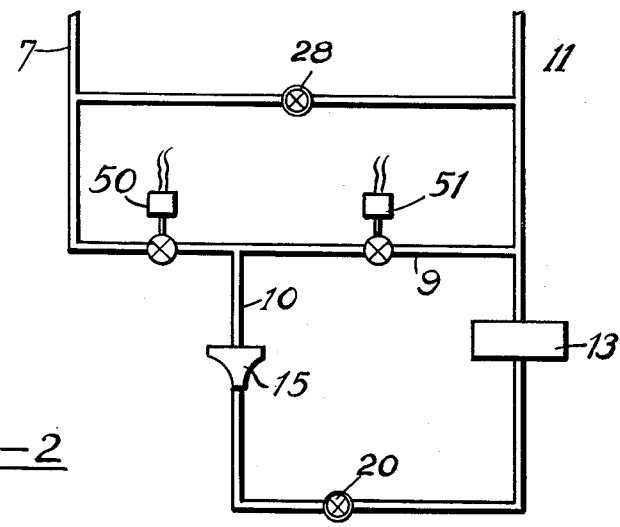
Figure 3:
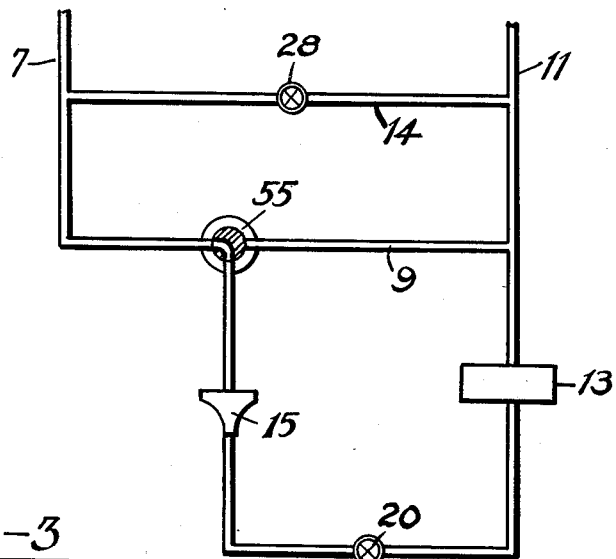

In these drawings Figure 1 diagrammatically illustrates a complete embodiment of this invention utilizing a single solenoid valve, and Figure 2 illustrates a modification of the apparatus of Figure 1 embodying two "open and close" solenoid valves, and Figure 3 represents a further modification of the apparatus of Figure 1 utilizing a two-way valve controlled by a timing motor.

Referring now to Figure 1 of the drawing, numeral 1 designates a line from which it is desired to withdraw samples. As stated any fluid, such as oil, gas, or water may be conducted in line 1. Positioned in the line is an orifice 2 which may be of any design. The sole function of the orifice is to supply a pressure drop in the line which will set up pressure differences in the associated lines 3 and 4 connected to the high and low pressure taps of the orifice. It will be apparent as the description proceeds that while the nature of the orifice is not critical, the pressure drop provided by the orifice is critical. It is necessary that the orifice be so chosen that a sufficient pressure drop will exist across the orifice to force a reasonable quantity of sample to pass through line 3; and yet that the pressure drop is not so large as to completely displace the mercury in the apparatus being described. Connected to the high and low pressure conduits, 3 and 4, of the orifice are drums 5 and 6. Hereinafter drum 5 will be designated as the "sample drum" as it is in this drum that the sample withdrawn from line 1 is accumulated. The drum 6 will similarly be designated as a "seal liquid receiving drum" since its function is to serve as a reservoir for sealing liquid maintained in the system. This sealing liquid is any liquid which is not miscible with the fluid in the line from whch samples are withdrawn. For example, in the particular case where the fluid in line 1 is oil, the sealing liquid employed may be water or glycerine. Sufficient sealing liquid is introduced to the system to substantially fill one of the drums 5 or 6 and furthermore to fill associated lines of the system to be described. A line 36, provided with a restriction orifice 37, is connected between the lines 3 and 4. Bottom drawoff lines are positioned in each of drums 5 and 6 permitting passage of liquid from these drums to the measuring apparatus employed. Thus a line 7 from the bottom of drum 5 passes to the solenoid valve 8 which controls flow to lines 9 and 10. Similarly line 11 positioned in the bottom of drum 6 passes to line 12 connected to the mercury reservoir 13. A connecting line 14 is also provided between the lines 7 and 11. Solenoid valve 8 is connected, as stated to line 7 from sample drum 5 and is also connected to lines 9 and 10 connecting respectively to mercury reservoir 13 and the measuring chamber 15. This two-way solenoid valve is adapted to permit the flow of fluid through lines 10 and 9 or through lines 7 and 10 as desired. It is to be understood that this valve at the same time prevents flow of the liquid through any other combination of the lines connected to it. The solenoid valve 8 is operated by an electrical supply circuit indicated by conductors 16 and 17 and rectangle 18. Element 18 may be any desired type of time switch or pulsing switch. For example, switch 18 may consist of a repeating cycle timer as manufactured by Eagle Signal Corp., Moline, Ill., listed in Bulletin No. 265 of that company.

As the construction of the switch and solenoid valve is not a part of this invention they will not be described in detail. It is to be understood, however, that any desired type of valve or switch may be employed. As will be apparent, the function of switch 18 is to activate the solenoid valve for a particular interval of time during a particular interval of time. For example, it may be desired to activate valve 8 for one minute of each hour or for ten seconds of each minute. Line 10 connects the solenoid valve to the upper part of a measuring chamber 15 which is at least partially filled with mercury or an equivalent non-miscible liquid. Line 19 is connected to the lower part of the measuring chamber 15 and passes to the bottom of mercury reservoir 13. Mercury is maintained in the measuring chamber 15, in line 19 and in the mercury reservoir 13. It is desirable to provide a restriction or orifice 20 in line 19 to prevent surges in the system. The measuring chamber 15 is of critical construction which must be understood to appreciate the operation of this apparatus. The construction of this chamber depends upon the principle that the differential pressure developed across the orifice 2 will be a function of the square of the flow rate of the fluid in the conduit 1. Consequently measuring chamber 15 is so constructed that the volume of mercury displaced from measuring chamber 15, caused by differential pressure across orifice 2, will be directly proportional to the square root of the differential pressure across orifice 2 in line 1. The configuration of this chamber is best determined by simple experimental procedure. Thus with the measuring chamber 15 and the mercury reservoir 13 connected across the orifice 2 as illustrated, by varying increments of flow rate in line 1, the capacity of measuring chamber 15 for each increment is so chosen as to provide a particular vertical displacement of the mercury in reservoir 13. It will be found that the configuration of the measuring chamber 15 when employing a cylindrical reservoir 13 is represented by the formula $$X=\frac{1.414D^2\sqrt{r}}{\sqrt[4]{r^2+\pi^2D^4Y}}$$

where $X$=the diameter of the measuring chamber at a height Y from the height representing no differential pressure.

$D$=the diameter of the cylindrical mercury reservoir 13.

$r$=a constant which is equal to the maximum sample volume at maximum flow at differential pressure R divided by the square root of the differential pressure R.

$R$=Differential head range of instrument in inches of manometer fluid.

All dimensions given above are in inches.

In this formula practical limitations require the lower limit of the diameter of the chamber to be in the range determined by volume for Y or about .001R to .01R.

It may be noted that chambers having the required configuration of measuring chamber 15 are known to the art and are employed for various purposes. For example, a chamber as required in this invention is to be found in the flow meter identified in the Foxboro Catalogue, Bulletin No. 200-7, page 12, type 7U (7417).

While a suitable configuration for the measuring chamber 15 has been indicated for the case where a cylindrical mercury reservoir 13 is employed, a different configuration may be used for use with non-cylindrical mercury reservoirs. For example, if desired, both the mercury chamber and the mercury reservoir may be designed to have the same configuration, represented by the formula $$X=\frac{0.9597\sqrt[2]{V_M}}{(\sqrt[4]{Y})(\sqrt[4]{R})}$$

$V_M$=maximum sample volume in cubic inches. Other symbols are as defined above.

In this case one chamber must be inverted with respect to the other. It is to be understood therefore that the only restriction on the nature of the mercury chamber and reservoir is that the volume of mercury displaced from the mercury chamber into the reservoir is directly proportional to the square root of the differential pressure causing the displacement.

The manner in which the apparatus operates may now be understood. At the beginning of the sampling operation valves 21 and 22, in lines 3 and 4 leading from orifice 2, are closed. No differential pressure existing on the system therefore, the mercury in the lower part of the system substantially fills the measuring chamber 15 leaving the mercury reservoir 13 only partly filled with mercury. The sealing liquid which, as stated, may be water, fills the upper portions of chamber 15, mercury tube 13, and all lines below the drums 5 and 6. Sufficient sealing liquid is employed so that the liquid also approximately half fills drums 5 and 6. Sufficient sealing liquid may be introduced to the system through line 30. When the sealing liquid has been properly introduced, as described, the apparatus may be brought to the pressure existing in line 1 by opening valve 22 associated with the low pressure tap of orifice 2. Valve 24 and valves 29, 28, and 27 are similarly opened, while valves 21, 26, and 25 are closed. Fluid from line 1 will therefore flow through line 4 into drum 6 and impart the hydrostatic pressure of line 1 to the system. Sealing liquid is then displaced from drum 6 to drum 5 by opening valve 25 and valve 26 permitting fluid to discharge from outlet 35. The valves are so maintained until substantially all the sealing liquid has been displaced from drum 6 and introduced to drum 5, substantially filling drum 5.

A sample may now be withdrawn as desired. In order to withdraw a sample, valves 28 and 26 are closed and valves 21 and 25 are opened. Solenoid valve 8 is then activated to permit flow of fluid through lines 7 and 10 and to prevent flow of liquid through line 9. When the solenoid valve is so operated, the pressure difference existing across the orifice 2 will cause the sealing liquid in drum 5 to be displaced through line 7 and line 10 into the measuring chamber 15, simultaneously displacing mercury from this measuring chamber and forcing it into the mercury reservoir 13 through line 19. This causes sealing liquid to be expelled from mercury reservoir 13 and to be introduced to the sealing liquid receiving drum 6, displacing line liquid in drum 6 through line 4 back into line 1. This flow will continue until the displacement of the liquid in drum 5, caused by the differential pressure, has displaced the mercury in the lower part of the system sufficiently to counterbalance the pressure differential applied. Consequently an amount of fluid will be withdrawn from line 1 and will be contained in drum 5 which is proportional to the flow rate existing in conduit 1. After this operation has been completed solenoid valve 8 may be deactivated changing its position. The interval of time over which the solenoid is activated is critical and must be at least sufficient to permit the flow to equilibrium as described. On deactivation of the solenoid valve 8, flow through lines 7 and 10 is cut off and flow is permitted through lines 10 and 9. This releases the differential pressure applied to the mercury in the system permitting the mercury to leave chamber 13 and once more substantially fill chamber 15. Simultaneously sealing fluid flows from the upper portion of measuring chamber 15 through line 10 and line 9 to the upper portion of mercury reservoir 13. This completes one sample cycle, and will be operative to place in drum 5 a sample which corresponds in quality to the nature of the fluid flowing in line 1 and proportional quantity to the flow rate of the fluid in line 1 at the time the sample was taken. The deactivation of solenoid valve 8 to finish one sample cycle will also restore the system to permit another sample to be taken on reactivation of the solenoid valve. As the apparatus of this invention is generally employed, it is contemplated that the sampling cycle will be repeated at desired intervals in order that a composite sample will be obtained to indicate the composition fluid in line 1 over extended periods of time. Thus, the timing switch 18 may be so chosen as to cause periodic activation of the valve 8 over any desired interval such as ten minutes, thirty minutes, or several hours. At the end of any desired sampling period when the desired composite sample has been accumulated, the sample may then be withdrawn from drum 5 through valves 25 and 26 and discharge line 35. In order to withdraw the sample through line 35 valves 21 and 23 are closed and valve 28 is opened. This will disconnect the high pressure side of orifice 2 from the system and permit withdrawal of sample from drum 5 without contamination of liquid flowing through line 1 at the time the sample is withdrawn. The procedure for withdrawing a sample is as follows:

A portable sampling drum is attached to line 35. This sampling drum is initially filled with a sealing liquid. Valve 26 is then opened and the sealing liquid contained in the portable sampling drum will be withdrawn from a bottom connection. The pressure in line 1 as applied through line 4 will force the sealing liquid in drum 6 out through lines 11, 14 and 7 into sample drum 5 which in turn will force the sample through valves 25 and 26 into the portable sampling drum through line 35.

It is apparent the apparatus of this invention may be modified and improved by various expedients, several of which are indicated in the drawings. For example, it is preferred to maintain a restriction orifice 37 in line 36. The orifice 37 is such that only a small flow of fluid is permitted so that at all times there is a continuous flow of the liquid of conduit 1 through lines 3, 36 and 4. As a result, a fresh sample from line 1 is continuously maintained at the inlet of the sampling drum 5. Again it is convenient to employ a gauge glass 40 in conjunction with the sampling drum 5 so as to determine the extent to which drum 5 is filled with samples which have been withdrawn. Further refinements and modifications are indicated in Figures 2 and 3. In Figure 2 an embodiment of this invention is illustrated in which two solenoid valves 50 and 51 are employed in place of the single solenoid valve 8 of Figure 1. In Figure 2 parts appearing in Figure 1 are indicated by the same numerals and are shown in the same general arrangement. It will be understood therefore that Figure 2 represents the lower part of Figure 1 showing the lines 7 and 11 and the lower elements of the apparatus. In place of the single solenoid valve 8, which as stated was a two-way solenoid valve, the two valves 50 and 51 are employed which are simple open or closed, solenoid valves. It may be preferred to employ the two valves of Figure 2 in place of the valve shown in Figure 1. In this case the apparatus of Figure 1 is altered by inserting valve 51 in line 9 of Figure 1 and by inserting valve 50 in line 7 of Figure 1. The same type of timing switch 18 may be employed to operate these two valves relying upon one position of the timing switch to activate valve 50 permitting a sample to be drawn into the sampling drum 5 and in the second position of the timing switch activating valve 51 to permit releasing the differential pressure on the mercury in the measuring chamber 15 and mercury tube 13. In all other respects the operation of the modification shown in Figure 2 is the same as described in connection with Figure 1.

A further modification of the apparatus of this invention is illustrated in Figure 3. Again in this figure the same general configuration of the component parts are maintained so that only the lower part of Figure 1 is reproduced. In the embodiment shown a timing motor is employed to operate a conventional two-way valve 55 so as to duplicate the function of the solenoid valve 8 of Figure 1. The timing motor may be of any desired type such as those manufactured by Barber-Colman Company, Rockford, Ill. or Bodine Electric Company, Chicago, Ill. and is characterized by performing a particular cycling function at desired time intervals. Thus the motor is effective to alter the position of the two-way valve at the proper intervals to reproduce the function of the valves heretofore described. Thus by the continuing rotation of the timing motor, at any desired speed, the cycling steps described before may be carried out.

What is claimed is:

1. Apparatus for sampling fluid flowing through a conduit comprising in combination, means for causing a pressure differential at a particular point of the conduit, a first branch fluid passageway connected to said conduit at two points, above and below said point of pressure differential, said first branch fluid passageway including a first pair of fluid reservoirs, and a second branch fluid passageway connecting to each of said first pair of fluid reservoirs, said second branch including a second pair of fluid reservoirs, and valves in said branch passageways operative in a first position to provide a fluid passageway through each of said fluid reservoirs and operative in a second position to provide a fluid passageway through said second pair of fluid reservoirs and one of the said first pair of fluid reservoirs, cutting-off any fluid passageway through the other of said first pair of fluid reservoirs.

2. The apparatus defined by claim 1 in which the said second pair of fluid reservoirs have a configuration adapted to provide a vertical displacement of fluid proportional to the square root of the differential pressure across the said means for causing a pressure differential.

3. The apparatus defined by claim 1 in which a conduit connected to said first fluid branch passageway provides a fluid passage in said branch passage, by-passing said first pair of fluid reservoirs, and a restriction positioned in said conduit whereby a continual controlled flow of fluid through said conduit may be maintained independent of fluid flow through said first pair of fluid reservoirs.

4. The apparatus defined by claim 1 in which a restriction to fluid flow is positioned in said second branch whereby fluid surges through the second branch are minimized.

5. Apparatus for sampling fluid flowing through a conduit comprising in combination, means for causing a pressure differential at a particular point of the conduit, a first branch fluid passageway connected to said conduit at two points, above and below said point of pressure differential, said first branch fluid passageway including a first pair of fluid reservoirs, and a second branch fluid passageway connecting to each of said first pair of fluid reservoirs, said second branch including a second pair of fluid reservoirs, valves in said branch passageways operative in a first position to provide a fluid passageway through each of said fluid reservoirs and operative in a second position to provide a fluid passageway through said second pair of fluid reservoirs and one of the said first pair of fluid reservoirs, cutting-off any fluid passageway through the other of said first pair of fluid reservoirs, and a timing switch operatively connected to said valves to control the said positioning of the valves.

HARRY B. BREEDLOVE.
HENRY G. ABBOTT.

REFERENCES CITED

The following references are of record in the file of this patent:

UNITED STATES PATENTS

| Number | Name | Date |
| --- | --- | --- |
| 1,649,399 | Gard | Nov. 15, 1927 |
| 2,245,679 | Kelley | June 17, 1941 |
| 2,350,323 | Cochran et al. | June 6, 1944 |
| 2,452,143 | Pellettere | Oct. 26, 1948 |